May 3, 1938. H. J. FINDLEY 2,116,145
AUTOMOBILE AIR HEATING AND CONDITIONING DEVICE
Filed Jan. 22, 1938 4 Sheets-Sheet 1
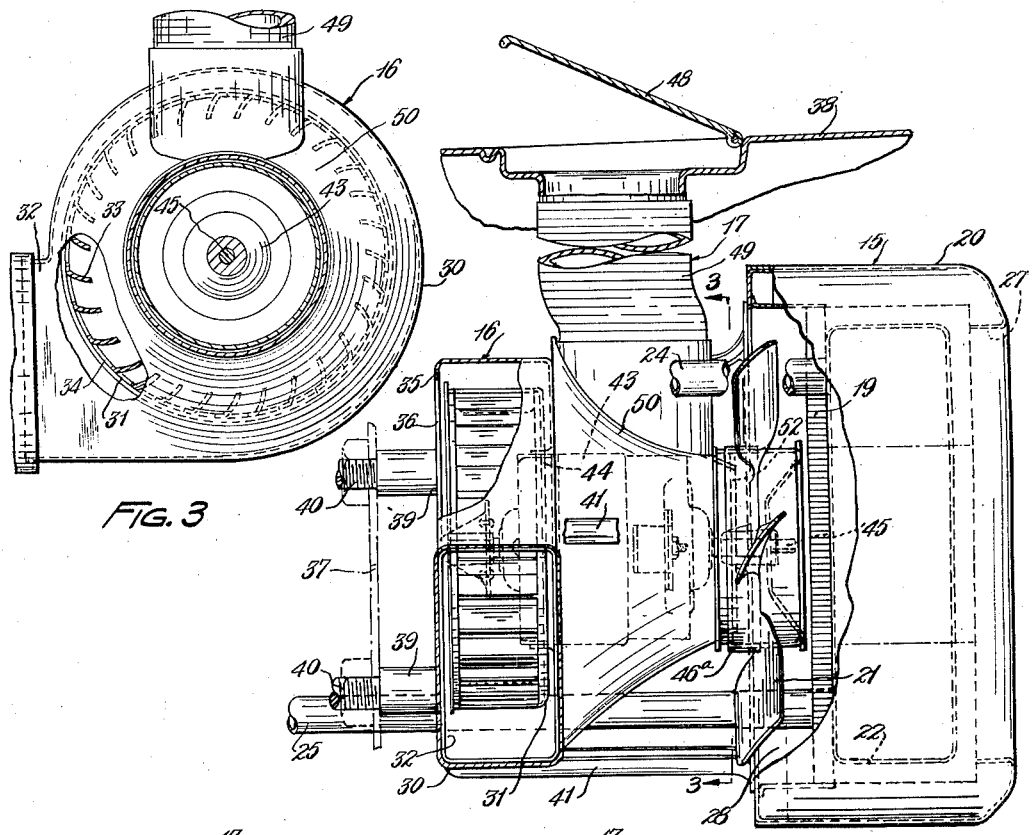
FIG. 3
FIG. 1
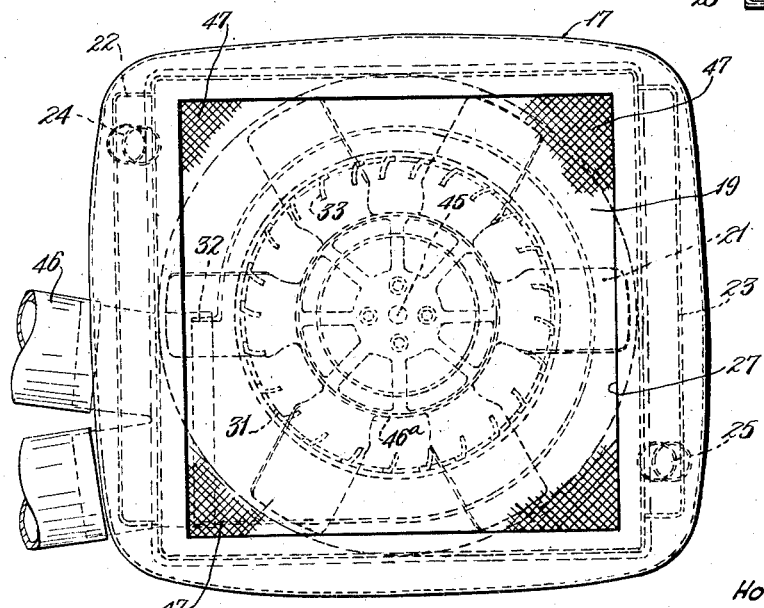
FIG. 2
INVENTOR.
HOWARD J. FINDLEY
BY Kurs Hudson & Kent
ATTORNEYS May 3, 1938.  H. J. FINDLEY  2,116,145

AUTOMOBILE AIR HEATING AND CONDITIONING DEVICE

Filed Jan. 22, 1938  4 Sheets-Sheet 2

INVENTOR.
HOWARD J. FINDLEY
BY
Kwis Hudson & Kent
ATTORNEYS

May 3, 1938.    H. J. FINDLEY    2,116,145
AUTOMOBILE AIR HEATING AND CONDITIONING DEVICE
Filed Jan. 22, 1938    4 Sheets-Sheet 3

INVENTOR.
HOWARD J. FINDLEY
BY Kwis Hudson & Kent
ATTORNEYS

May 3, 1938. H. J. FINDLEY 2,116,145
AUTOMOBILE AIR HEATING AND CONDITIONING DEVICE
Filed Jan. 22, 1938 4 Sheets-Sheet 4

INVENTOR.
HOWARD J. FINDLEY
BY
Kwis Hudson & Kent
ATTORNEYS

Patented May 3, 1938

2,116,145

UNITED STATES PATENT OFFICE 2,116,145

AUTOMOBILE AIR HEATING AND CONDITIONING DEVICE

Howard J. Findley, Euclid, Ohio, assignor to Eaton Manufacturing Company, Cleveland, Ohio, a corporation of Ohio Application January 22, 1938, Serial No. 186,425

8 Claims. (Cl. 257—137)

This invention relates to air heating and conditioning apparatus, and more particularly to improved apparatus of this kind which is especially suitable for heating and conditioning the air of the passenger compartment of an automobile or other motor vehicle.

An object of my invention is to provide improved vehicle heating and air conditioning apparatus having a heat-exchange element and means for recirculating air of a vehicle compartment and causing the same to pass through such element, and in which means is provided for taking fresh air from outside the vehicle and causing the same to pass through the heat-exchange element before being discharged into the vehicle compartment.

Another object of my invention is to provide improved vehicle heating and air conditioning apparatus of this character, in which the fresh air is forced into the vehicle in response to the forward motion thereof.

Still another object of my invention is to provide an improved vehicle heating and air conditioning device having a heat-exchange element and a shell defining a plenum chamber, and in which portions of such chamber extend relative to the element to permit fresh air from outside the vehicle to be passed through the element before being discharged into the vehicle compartment.

A further object of my invention is to provide vehicle heating and air conditioning apparatus having a heat-exchange core and a shell defining a plenum chamber enclosing portions of the core, and in which a baffle divides the plenum chamber into sections and means for taking fresh air from outside the vehicle delivers the same into one of the plenum chamber sections for passage through the enclosed portions of the core and into the other plenum chamber section before being discharged into the vehicle compartment.

Still another object of my invention is to provide a device for heating and conditioning the air of a vehicle compartment in which a fan operating to recirculate air of the compartment passes the same through a portion of a heat-exchange core and a shell partially surrounding the core forms a plenum chamber into which fresh air from outside the vehicle may be forced, the plenum chamber being arranged to cause the fresh air to pass through another portion of the core before being discharged into the vehicle compartment.

Yet another object of my invention is to provide a combined defrosting and air conditioning heater having a pair of fans operable to recirculate air of the vehicle compartment, one acting to cause recirculated air to pass through a heat-exchange element and the other acting to recirculate air of the vehicle compartment without passage through the heat-exchange element and to discharge a stream of such air away from the device for windshield defrosting, or other purposes, and in which a reversible motor forming a common drive for such fans permits variable operation thereof and means for taking fresh air from outside the vehicle causes the same to pass through a portion of the heat-exchange element before being discharged into the vehicle compartment.

Other objects and advantages of my invention will be apparent from the following description when taken in conjunction with the accompanying sheets of drawings, in which Fig. 1 is a side elevation, with portions broken away, showing an air heating and conditioning device embodying my invention.

Fig. 2 is a front view of the device.

Fig. 3 is a transverse sectional view taken through the device as indicated by line 3—3 of Fig. 1.

Figure 6:
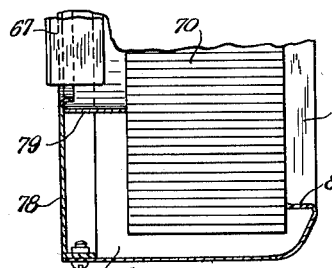
Fig. 6 is a partial sectional view taken through the heat-exchange unit of the device as indicated by line 6—6 of Fig. 5.

More detailed reference will now be made to the accompanying drawings in which I have shown different embodiments of my improved means for heating and conditioning the air of a vehicle compartment, but, before proceeding with the detailed description, it will be understood, of course, that the drawings are to be regarded as being mainly illustrative and that the invention may be embodied in various other devices of this character.

The embodiment of my air heating and conditioning device shown in Figs. 1 to 3 comprises in general a heat-exchange unit 15, a blower or defrosting unit 16, and a fresh air supply means 17. The heat-exchange unit operates to recirculate and heat air of the vehicle compartment and to also heat the supply of fresh air. The blower unit recirculates air of the vehicle compartment without passage through the heating means and discharges a stream of such air away from the device for windshield defrosting or other purpose.

The heat-exchange unit 15 comprises a core or element 19 partially surrounded by a shell or housing 20 and a fan 21 which is rotatable adjacent the core for causing a flow of air therethrough. The core or element 19 may be of any type commonly used in air heating and conditioning apparatus and may have numerous air passages therethrough in heat-exchange relation to other passages provided for the circulation of hot water or other conditioning medium. The core may have tanks 22 and 23 at the ends thereof with which supply and discharge pipes 24 and 25 are connected, respectively. The shell 20 may be in the form of a sheet metal housing constructed of one or more parts and arranged to extend around edge portions of the core to provide a front opening 27 of square or other desired shape and a fan space 28 adjacent the rear face of the core.

The blower unit 16 comprises a housing 30 and a fan or blower 31 operable therein. The blower housing may be constructed of sheet metal or other suitable material and is of scroll or spiral shape having a substantially tangential discharge opening or spout 32 leading therefrom. The blower 31 which is of the centrifugal type may be of a hollow sheet metal construction and may have an annular or rim portion which carries a series of blades 33 and is provided with peripheral openings 34 therein between the pairs of adjacent blades. The rear wall 35 of the blower housing, in other words the wall of the blower housing which is furthest from the heat-exchange unit 15, is provided with one or more air intake openings 36 through which air from the vehicle compartment may enter the blower housing and pass to the blower 31.

My improved air heating and conditioning device may be located at any convenient point of the vehicle compartment, such as on the dash 37 and under the cowl 38 of the vehicle. In mounting the device on the dash 37, the rear wall 35 of the blower housing is maintained in spaced relation to the adjacent surface of the dash so that air of the vehicle compartment can readily pass to the intake opening 36. This spaced relation between the blower housing and the dash may be maintained by means of spacers or shouldered portions 39 provided on the mounting studs 40 which project from the blower housing and extend through the dash. The heat-exchange unit 15 may be connected with the blower unit 16 and supported therefrom by suitably arranged brackets or supporting arms 41.

For driving the propeller fan 21 and the blower 31 I provide a single driving motor 43 which, for a reason to be presently explained, is preferably a reversible motor. This motor may be supported on the blower housing 30 and may be located between the heat-exchange unit 15 and the blower housing with a portion of the motor extending into the flanged central opening 44 of the latter. The armature shaft 45 projects from opposite ends of the motor and at its forward end carries the propeller fan 21 and at its rear end carries the fan or blower 31. The fans 21 and 31 and the blower housing 30 are so constructed and arranged that when the motor 43 runs in a given direction one fan will operate in a forward direction and the other fan will operate in a backward direction and, when the motor is reversed as by means of a suitable reversing switch, the one fan runs backward while the other runs forward. Each of the fans may be so constructed, as to pitch and other characteristics, that when it runs in a forward direction it operates at full-load and when it runs in a backward direction it operates in a partially unloaded condition.

In the operation of the device, as thus far described, the rotation of the propeller fan 21 in a clockwise direction, as seen in Fig. 2 and which for convenience may be referred to as the forward direction, recirculates air of the vehicle compartment and causes such air to be passed through the core 19 and discharged through the front opening 27. For this same direction of rotation of the motor 43 the blower 31 is driven in a backward direction and operates in a partially unloaded condition to recirculate air of the vehicle compartment and discharge a stream of such air through the spout 32 for delivery to a desired point of the vehicle compartment, such as the windshield, through a duct or ducts 46 which may be connected with such spout. When the direction of rotation of the motor 43 is reversed, the fan 21 runs in a backward direction and the blower 31 runs in a forward direction. For this direction of rotation the fan 21 operates at reduced efficiency or in a partially unloaded condition and draws air from the vehicle compartment through the front opening 27 and the core 19, and the blower 31 operates at maximum efficiency and delivers an increased volume of recirculated air through the discharge spout 32 for windshield defrosting or other desired use.

In explaining the operation of the device I have referred to the fan 21 as being fully loaded in its forward or out-draft direction of rotation, and as being partially unloaded in its backward or in-draft rotation, but obviously, if desired, the forward or out-draft rotation for this fan may be its partially unloaded condition and the in-draft rotation may be its fully loaded condition. Similarly, if desired, the blower unit 16 may be such that the blower 31 operates at full load when the fan 21 operates as an out-draft fan, and rotates under partial load during the in-draft rotation of the fan 21. It is also apparent that the design of the fan and blower may be varied and may be such as to produce any desired degree of loading or unloading for either fan whether it operates in a forward direction or in a backward direction.

For a purpose to be presently explained, the propeller fan 21 may be constructed with a hollow hub portion 46ᵃ which is connected with the armature shaft of the motor 43 and with the circumferentially spaced blades surrounding such hub portion. With this construction for the fan 21 it will be seen that rotation of the fan will cause air to flow through the outer portions of the core 19, including the corner sections 47 thereof, but will cause little or no air to flow through the circular central section which is opposite the hollow hub and of approximately the same diameter.

The fresh air supply means 17 which operates to take fresh air from outside the vehicle and deliver the same into the vehicle compartment through the heat-exchange unit 15 is an important part of my invention and accomplishes highly desirable and very important advantages. The fresh air taken in from outside the vehicle is relatively dry air and when heated and mixed with the recirculated air of the vehicle compartment will reduce or eliminate objectionable fogging of the windows and windshield as the result of condensate collecting thereon. For this fresh air supply means I preferably employ means which will force the fresh air into the vehicle in response to forward motion thereof and, in this way, secure certain additional highly desirable and important advantages. When the fresh air is forced in by the forward motion of the vehicle a pressure condition will be created in the vehicle compartment which will tend to prevent the infiltration of dust and cold or contaminated air around the doors and windows, or at other points. Another important advantage is that when the vehicle is traveling along a clear road at moderate or high speed, a substantial volume of clean fresh air will be forced in, but when the vehicle is in close traffic, or pulls up behind a slow vehicle, its forward motion will be relatively slow, and hence substantially no air containing exhaust gases will be forced in, such as might otherwise create a hazardous or uncomfortable condition in the vehicle. By using the forward motion of the car for introducing the fresh air, the need for a fresh air intake fan or blower is avoided, with a consequent reduction in the cost of the equipment and in the consumption of current from the electrical system of the vehicle. In providing for the heating of the fresh air supplied in this manner before being mixed with the recirculated air, it is possible in mild weather to increase the temperature of the vehicle to a point of comfort without requiring the operation of the propeller fan 21 of the heat-exchange unit, and hence without any drain whatever on the electrical system. In severe weather, after the inside temperature of the vehicle has been brought up to a point of comfort by the operation of the recirculating fan or fans of the heating and conditioning device, such operation and its drain on the electrical system can be discontinued because the inside temperature can be maintained at a point of comfort by the supply of heated fresh air.

This fresh air supply means may include an air intake scoop device 48 which may be located on the cowl 38 or at any other desired point of the vehicle. A duct 49 leads from the scoop device 48 and connects with a hollow air discharge member 50 which may be disposed between the units 15 and 16 and may partially house the motor 43. The member 50 may be of tapering truncated form and may be disposed with its small end 52 adjacent to or extending part way into the hollow hub of the fan 21 and with its rear or large end closed by the adjacent or front wall of the blower housing 30. The small end 52 may have an opening from which the fresh air is discharged into the hollow hub of the fan 21 and through the central section of the core 19 into the vehicle compartment.

When the operator of the vehicle desires to introduce fresh air from outside the vehicle, he opens the scoop device 48 and, as the result of the forward movement of the vehicle, air will be forced through the duct 49 into the hollow member 50 and then through the hollow hub of the fan 21 and the corresponding central section of the core. The fresh air thus forced through the core will be heated before it is discharged into the vehicle compartment.

The tapering shape for the hollow member 50 is desirable because it enables this member to also act as a deflector for the stream of air which is discharged by the fan 21 when the heat-exchange unit 15 is operating as an indraft heater.

Figure 4:
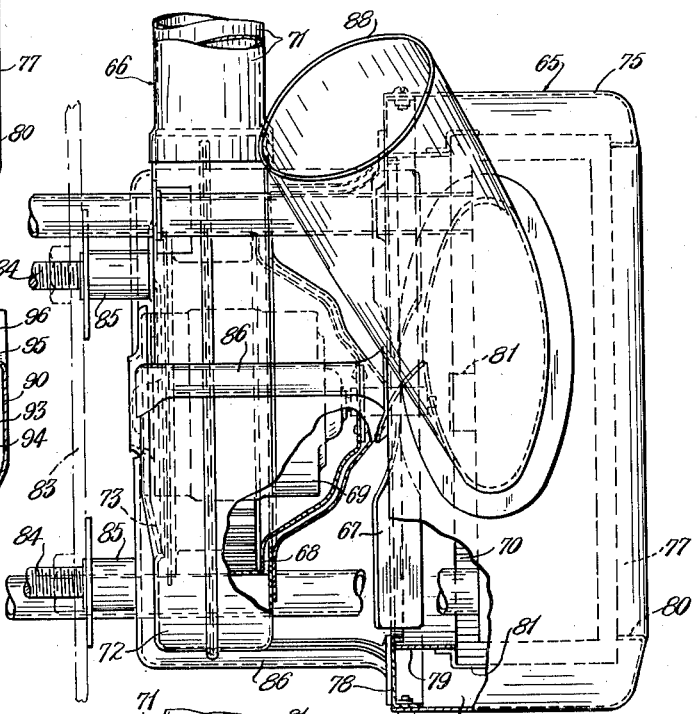
Fig. 4 is a side elevation, with portions broken away, showing another air heating and conditioning device constructed according to my invention.
Figure 5:
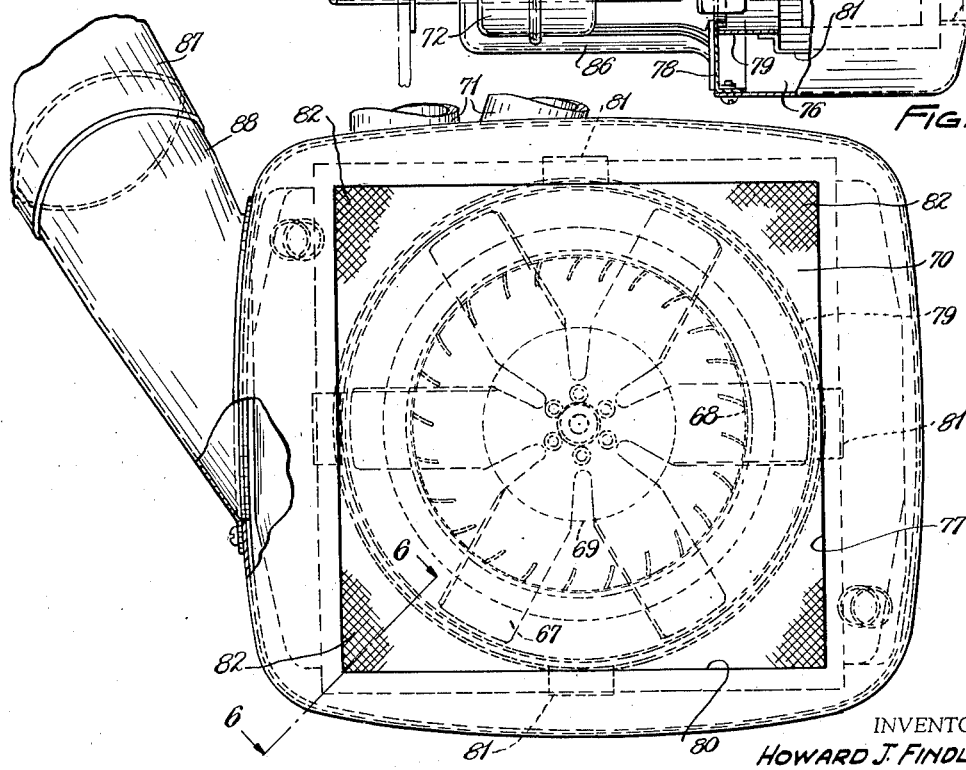
Fig. 5 is a front view of the device showing the same with portions thereof broken away.

In Figs. 4 and 5 of the drawings I show another embodiment of my invention comprising a heat-exchange unit 65 and a blower unit 66, and which also embodies means for taking fresh air from outside the vehicle and delivering it through portions of the core of the heat exchange unit into the vehicle compartment. This form of my device is generally similar to the device of Fig. 1 in that a propeller fan 67 of the heat-exchange unit 65 and a centrifugal fan or blower 68 of the blower unit 66 are adapted to be driven simultaneously by a reversible motor 69 and are so constructed and arranged that when one fan runs in a forward direction the other fan operates in a backward direction. The fan 67 operates to recirculate air of the vehicle compartment and to cause a flow of such air through the core or element 70 of the heat-exchange unit. The blower 68 operates to deliver air into a duct or ducts 71 leading away from the device for discharging air adjacent the windshield or at some other desired point of the vehicle. The air handled by the blower 68 is taken from the vehicle compartment and may be drawn into the blower housing 72 through one or more openings 73 in the rear wall thereof. The characteristics and relative arrangement for the fans 67 and 68 may be such as to obtain any desired degree of loading or unloading for either fan whether operating in a forward direction or in a backward direction.

In addition to the fan 67 and the core 70, the heat-exchange unit 65 includes a shell or housing 75 which is disposed around the core so as to provide a plenum chamber 76 therebetween and a main discharge opening 77, preferably of square or rectangular shape, at the front of the unit. The shell 75 may be formed of any desired number of parts and may include a rear cover section 78 and a circular ring 79, the latter being disposed adjacent the rear face of the core and within which the fan 67 operates. The shell 75 is so constructed and arranged that portions of the plenum chamber 76 extend in overlying relation to the rear face of the core 70, as shown in Fig. 6, with the ring 79 forming an end wall for such overlying portions of the plenum chamber. At the front of the core a flange portion 80 of the shell extends around and defines the square or rectangular discharge opening 77, and also forms a closure wall for the forward end of the plenum chamber 76. The fan ring 79 may be suitably held in place between the rear face of the core and the rear shell section 78 by suitable clips 81 connected with the ring and engaging the core at spaced points.

Since the fan ring 79 is circular and the front opening defined by the flange 80 is square or rectangular, it will be seen from Fig. 5 that there are corner sections 82 of the core lying outward of the ring and through which air will not be forced by the fan 67. It will also be seen that since portions of the plenum chamber 76 extend in overlying relation to these corner sections of the core, air can be caused to flow through such corner sections by introducing pressure into the plenum chamber.

This air heating and conditioning device may be located at any desired point of the vehicle and, as explained above in connection with the device of Fig. 1, it may be located beneath the cowl of the vehicle and on the dash 83. In mounting the device on the dash the blower unit 66 may be connected therewith by studs 84 with the rear wall of the blower housing spaced from the dash by means of intervening spacers 85. The heat-exchange unit 65 may be connected with the blower unit 66 and supported therefrom, as by means of suitably arranged arms or brackets 86.

For introducing air pressure in the plenum chamber 76 I provide means for taking fresh air from outside the vehicle, such as the air scoop device 48 shown in Fig. 1, which is connected with the plenum chamber by means of the duct 87 and the intake connection 88 of the shell 75. During the forward motion of the vehicle, clean fresh air is forced into the plenum chamber 76 and the pressure thus created in the plenum chamber causes the fresh air to pass through the corner sections 82 of the core and out through the front opening 77 into the vehicle compartment.

Figure 7:
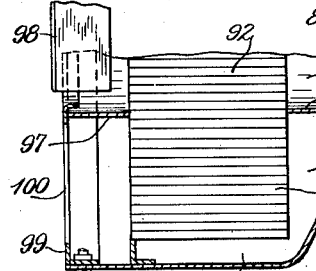
Fig. 7 is a similar partial sectional view illustrating still another form of my air heating and conditioning device.

In some instances it may be desirable to have these fresh air streams emerge from the core at the rear thereof instead of the front so that it can be more readily mixed with the stream of air being handled by the fan 67. When this result is desired I employ a different arrangement for the plenum chamber and the front opening of the heat-exchange unit. In this modified arrangement, as shown in Fig. 7, I may construct the shell 90 of the heat-exchange unit so that the plenum chamber 91 extends around a heat-exchange core 92, which is preferably of square or other polygonal shape, with a portion 93 of such chamber in overlying relation to the front face of the core and the corner sections 94 thereof. The shell portion overlying the front face of the core has an annular flange 95 which defines a circular front opening 96 and also forms an end wall for the plenum chamber extension 93.

At the rear of the core 92 I provide a circular ring 97 which surrounds the fan 98 and may be suitably held in place between the core and the rear cover section 99 of the shell. The fan ring 97 is disposed substantially opposite the flange 95 and is of substantially the same diameter, and during operation of the fan prevents the latter from forcing air through the corner sections 94 of the core. When fresh air from outside the vehicle is forced into the plenum chamber 91 it will flow rearwardly through the corner sections 94 of the core where it will be heated before passing out through the opening or openings 100 of the rear shell section 99 into the vehicle compartment.

Figure 8:
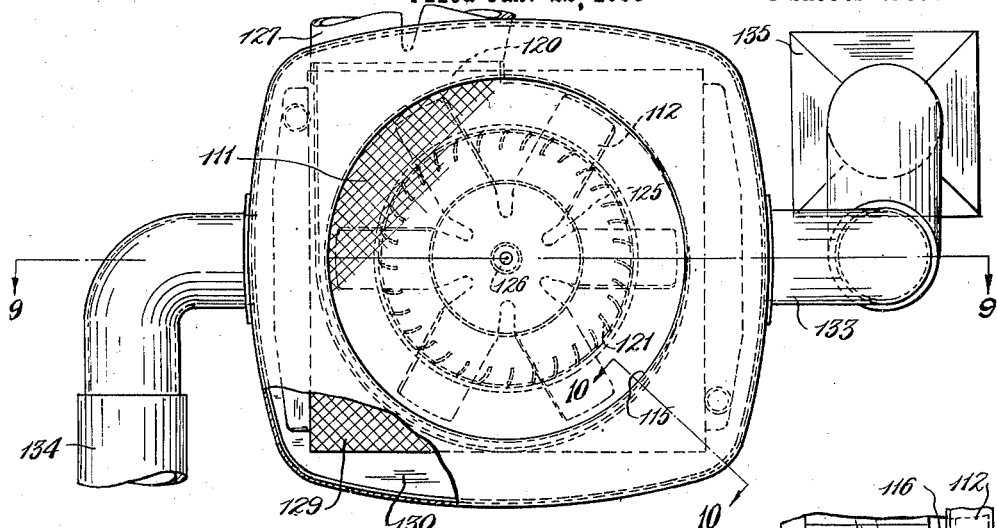
Fig. 8 is a front view, with portions broken away, illustrating another air heating and conditioning device embodying my invention.
Figure 10:
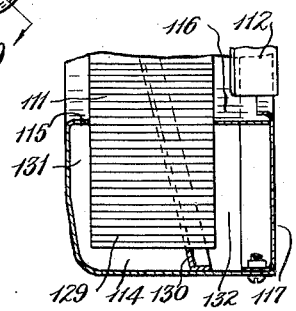
Fig. 10 is a partial sectional view taken through the heat-exchange unit as indicated by line 10—10 of Fig. 8.
Figure 9:
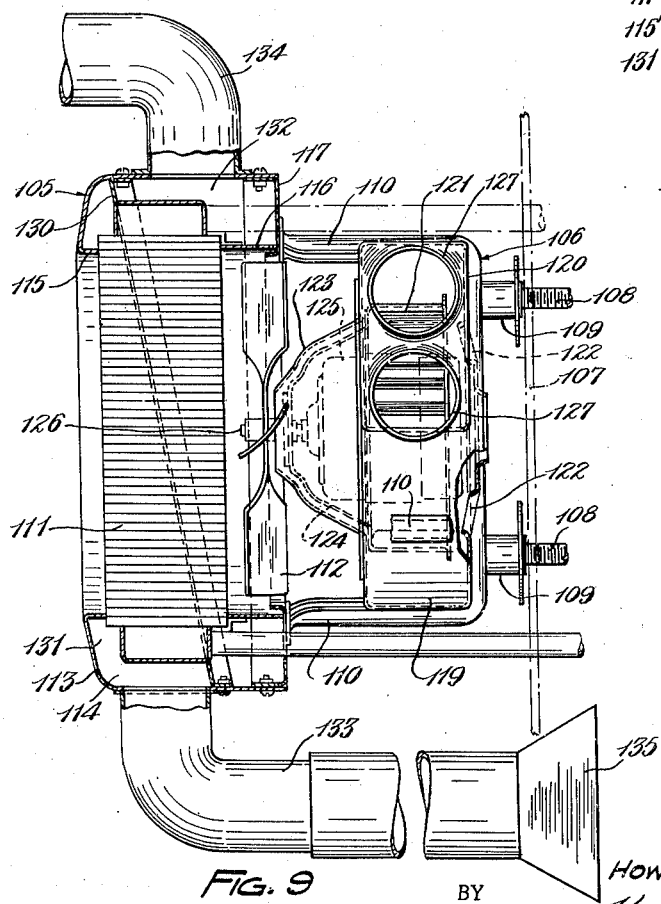
Fig. 9 is a sectional plan view taken through the device substantially as indicated by line 9—9 of Fig. 8.

In Figs. 8, 9, and 10 I show another embodiment of my vehicle heating and air conditioning device which also comprises a heat-exchange unit 105 and a blower unit 106. The heat-exchange unit 105 operates to recirculate and heat air of the vehicle compartment and also to heat fresh air being introduced into the compartment from outside the vehicle. The blower unit 106 operates to recirculate air of the vehicle compartment and to discharge a stream or streams of such air away from the device for windshield defrosting or other purposes.

This device may be mounted in a manner similar to the device of Fig. 1, that is to say, on the dash 107 and beneath the cowl of the vehicle. The device may be connected with the dash by means of the studs 108 and with spacers or shoulders 109 engaging the adjacent surface of the dash for spacing the rear wall of the blower unit 106 therefrom. The heat-exchange unit 105 may be connected with the blower unit and suitably supported therefrom, as by means of the spaced arms or brackets 110.

The heat-exchange unit 105 comprises a heat-exchange core 111 which is preferably, though not necessarily, of square or other polygonal shape and a fan 112 for recirculating air of the vehicle compartment and causing the same to pass through the core. The heat-exchange unit also includes a shell 113 which is disposed around the core and defines a plenum chamber 114. The shell may be of sheet metal or other suitable construction having an inturned annular flange 115 defining a circular opening at the front face of the core. At the rear face of the core I may provide a circular ring 116 of substantially the same diameter as the flange 115 and within which the fan 112 operates. The fan ring 116 may be suitably held in place between the rear face of the core and a rear cover section 117 of the shell. This fan ring and the rear cover section 117 form portions of the wall of the plenum chamber 114.

The blower unit 106 comprises a housing 119 having a tangential discharge spout 120 and a centrifugal fan or blower 121 operable in such housing. The rear wall of the blower housing is provided with one or more openings 122 through which air from the vehicle compartment may be drawn by the blower. The front wall of the blower housing may be provided with a forwardly extending converging hollow portion 123 into which a correspondingly shaped hollow portion 124 of the blower 121 extends.

For driving the fan 112 and the blower 121 I provide a reversible electric motor 125 which may be mounted on the rear wall of the blower housing so as to extend forwardly inside of the blower. The fan and blower may be suitably mounted on the projecting forward end of the armature shaft 126 of the motor.

The fan 112 and blower 121 operate in a manner similar to the fan and blower of the devices of Figs. 1 and 4, that is to say the fan arrangement may be such that one runs forward while the other runs backward. When the fan 112 operates in its forward direction it recirculates air of the vehicle compartment and discharges a stream of such air through the core 111 and the front opening defined by the flange 115. While the fan 112 rotates in its forward direction the blower 121 runs in a backward direction and operates in a partially unloaded condition to discharge a reduced volume of recirculated air through the spout 120 for delivery by the duct or ducts 127 to the windshield or other desired point of the vehicle compartment. When the direction of rotation of the motor 125 is reversed, as by a suitable reversing switch in the motor circuit, the fan 112 runs in a backward direction and draws air from the vehicle compartment inward through the core 111. For this direction of fan rotation the blower 121 runs in a forward direction and discharges a larger volume of recirculated air through the spout 120 and the ducts 127.

As will be seen from Figs. 8 and 10, portions of the plenum chamber 114 of the heat-exchange unit 105 enclose sections of the core 111 which lie outward of the central or main section through which air is forced by the fan 112. In this instance the core 111 being of square or rectangular shape, the outer portions of the core which are enclosed by the plenum chamber 114 are the corner sections 129. For causing a flow of air through these corner sections of the core when air pressure is introduced into the plenum chamber 114 I provide a diagonal or relatively inclined baffle 130 which is located in the plenum chamber and arranged to divide the latter into air supply and discharge compartments or sections 131 and 132. With this arrangement it will be seen that when air pressure is introduced into the plenum chamber section 131 it will cause a flow of air through the outer or corner sections 129 of the core from the front face to the rear face thereof and into the plenum chamber section 132. The air thus entering the plenum chamber section 132 will be heated air and can be immediately discharged into the vehicle compartment or can be conducted to a more remote point of the vehicle compartment by the duct 134, such as to a hot air register adjacent the rear seat.

I prefer to operate the heating and conditioning device of Figs. 8 and 9 so that the air supplied to the plenum chamber section 131 is fresh air taken from outside the vehicle. For obtaining this supply of fresh air the duct 133 may be connected with any suitable supply device adapted to force the air into the plenum chamber section 131 but is preferably connected with a scoop device 135 which will force fresh air into the plenum chamber and through the core in response to forward motion of the vehicle. The scoop device 135 may be located at any suitable point of the vehicle such as on the cowl as suggested in Fig. 1 or adjacent the radiator grille.

Figure 11:
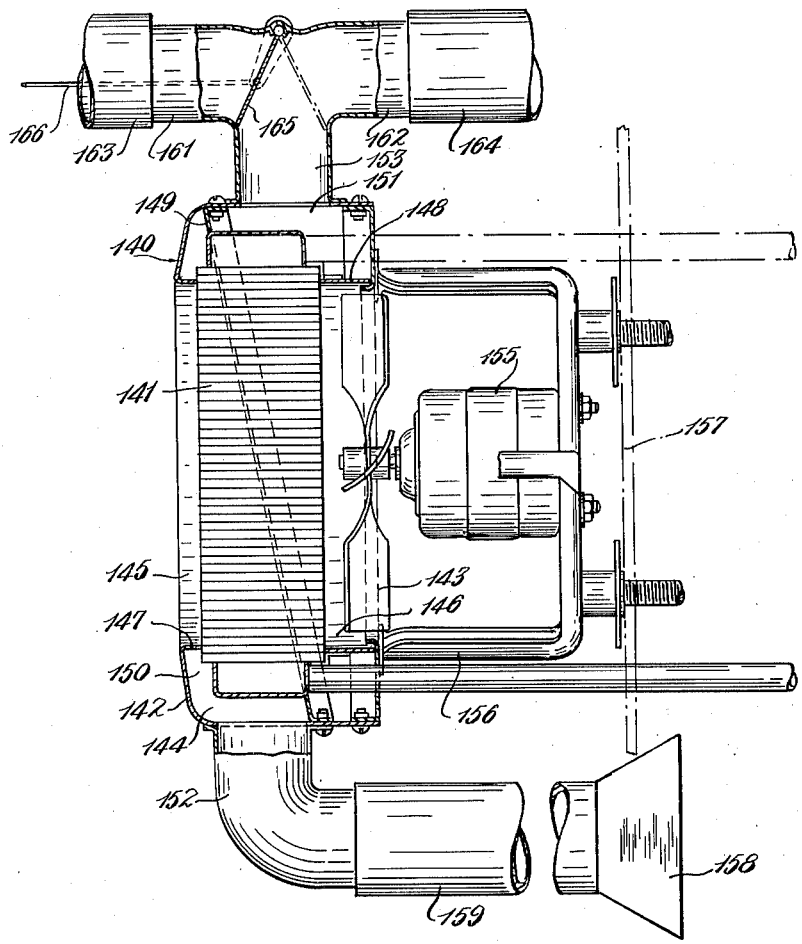
Fig. 11 is a sectional plan view similar to that of Fig. 9 but illustrating still another air heating and conditioning device embodying my invention.

In Fig. 11 I show another embodiment of my air heating and conditioning device which is somewhat similar to that of Figs. 8 and 9 but of more simplified form. In this embodiment I provide a heat-exchange unit 140 which is similar in construction to the heat-exchange unit 105 of the device of Figs. 8 and 9, that is to say, it comprises a core or element 141 having portions thereof enclosed by a shell 142 and a propeller fan 143 disposed adjacent the rear face of the core for recirculating air of the vehicle compartment and causing such air to pass through the core.

The shell 142 of the heat-exchange unit 140 is constructed and arranged to form a plenum chamber 144 around the perimeter of the core and which overlies and encloses portions of the core lying outward of the front and rear openings 145 and 146 which are defined, respectively, by the shell flange 147 and the fan ring 148. A diagonal or relatively inclined baffle 149 is mounted in the plenum chamber 144 to extend around the core and divide the plenum chamber into supply and discharge compartments or sections 150 and 151 with which the air supply and discharge fittings 152 and 153 are connected, respectively.

The propeller fan 143 is arranged to operate in the ring 148 to cause a flow of the recirculated air through the main or central section of the core which corresponds substantially in area and outline with the openings 145 and 146. This fan may be driven by an electric motor 155 which is adapted to be supplied with current from the storage battery of the vehicle. A suitable frame or bracket 156 extending rearwardly from the heat-exchange unit 140 provides a support for the motor 155 and may also be used in mounting the entire device on some appropriate part of the vehicle, such as the dash 157.

In the preferred operation of this air heating and conditioning device fresh air is taken from outside the vehicle and forced into the plenum chamber section 150 for passage through the outer or corner sections of the core into the plenum chamber section 151 before being discharged into the vehicle compartment. Any suitable means may be provided for taking fresh air from outside the vehicle but I prefer to use an air scoop device 158 for this purpose which may be connected with the fitting 152 by a duct or conduit 159 and which will cause fresh air to be forced into the plenum chamber section 150 in response to forward motion of the vehicle.

The heated fresh air discharged from the plenum chamber section 151 through the fitting 153 may be immediately directed into the vehicle compartment, such as toward the feet of the driver, or may be conducted to one or more other points of the vehicle before being discharged into the vehicle compartment. For the latter purpose I may provide the fitting 153 with branches 161 and 162 with which the conduits 163 and 164 are connected, respectively. The duct 164 may extend to a point or points adjacent the vehicle windshield for discharging defrosting air and the duct 163 may extend to the rear compartment of the vehicle for discharging heated fresh air into the vehicle compartment through a register or the like located adjacent the rear seat. The delivery of heated fresh air into the conduits 163 and 164 may be selectively controlled by a pivoted valve 165 which is adapted to be shifted by the operator by means of the actuating rod 166. The valve 165 may be set in a position to direct all of the air into one or the other of the conduits 163 and 164, or may be set at an intermediate position for causing some of the air to be directed into each of these conduits.

From the foregoing description and the accompanying drawings it will now be readily seen that I have provided several forms of devices for heating and conditioning the air of a vehicle compartment and that all of such devices are of relatively simple and inexpensive construction and are adapted for efficient and economical operation. It will be seen furthermore that in all of these devices I provide for a recirculation of air of the vehicle compartment and also provide means for taking fresh air from outside the vehicle and causing the same to be heated before being discharged into the vehicle compartment. By forcing fresh air through the heat-exchange unit and into the compartment in response to forward motion of the vehicle, I always obtain clean fresh air and, in addition, the pressure created in the compartment tends to eliminate infiltration of cold air around the doors and windows. It will also be seen that in all of the various forms of my air heating and conditioning devices, a large volume of defrosting air can be supplied to the windshield either in the form of recirculated air as provided in the devices embodying a defrosting fan, or in the form of heated fresh air as provided in the other devices. Moreover, it will be seen that when heated fresh air is supplied to the vehicle compartment in response to the forward motion of the vehicle, drier air is obtained in the vehicle compartment with a reduced fogging of the windows and windshield, and during certain conditions or periods of vehicle operation it will not be necessary to operate any fans or blowers, and hence a drain on the electrical system can be avoided during much of the vehicle operation.

While I have illustrated and described my improved air heating and conditioning means in a somewhat detailed manner, it should be understood, however, that I do not wish to be limited to the specific details of construction and manner of operation herein disclosed, but regard my invention as including such changes and modifications as do not involve a departure from the spirit of the invention and the scope of the appended claims.

Having thus described my invention, I claim:

1. In a device for air conditioning a motor vehicle compartment, a heat-exchange core, a fan operable to recirculate air of the vehicle compartment and cause the same to pass through a portion of said core, a second fan operable to recirculate air of the vehicle compartment without passage through the core and to discharge a stream of such air away from the device, a common motor for driving said fans, and means for causing fresh air from outside the vehicle to pass through another portion of the core and into the vehicle compartment in response to forward motion of the vehicle and independently of the air recirculating means, said motor being reversible for varying the action of said fans.

2. In a device for air conditioning a motor vehicle compartment, a heat-exchange core, a fan adjacent said core, said fan having a hollow hub portion disposed opposite a center section of said core and blades outwardly of the hollow hub portion for recirculating air of the vehicle compartment and causing the same to pass through portions of the core surrounding said center section, and means for taking fresh air from outside the vehicle and passing the same through said hollow hub portion and said center core section into the vehicle compartment.

3. In a device for air conditioning a motor vehicle compartment, a heat-exchange core, a fan adjacent the core operable to recirculate air of the vehicle compartment and cause the same to pass through said core, a hollow tapered deflector member extending in the direction of the rotation axis of the fan and having an air discharge opening at its small end disposed substantially opposite a center section of the core, and means for taking fresh air from outside the vehicle and conducting it into said hollow deflector member.

4. In apparatus for air conditioning a vehicle compartment, a polygonal heat-exchange element having air passages therein, a circular ring adjacent one face of said element, a fan operable in said ring for causing a flow of air through a corresponding section of the element, a shell extending around portions of the element and providing a plenum chamber having portions thereof overlying one face of the corner sections of the element which are disposed outward of said ring, and means for causing fresh air from outside the vehicle to be forced into said plenum chamber for passage through said corner sections of the element and into the vehicle compartment in response to forward motion of the vehicle.

5. In apparatus for air conditioning a vehicle compartment, a heat-exchange core, a shell disposed around the core to define a plenum chamber enclosing portions of the core, a baffle in the plenum chamber dividing the same into sections, and means for taking fresh air from outside the vehicle compartment and delivering the same into one of the plenum chamber sections for passage through the enclosed portions of the core and the other plenum chamber section into the vehicle compartment.

6. In vehicle heating apparatus, a heat-exchange element having air passages therein, a shell disposed around said element to define front and back openings at the corresponding faces of the element and also providing a plenum chamber enclosing portions of the element which lie outward of said openings, a baffle in the plenum chamber dividing the same into supply and discharge compartments, and means for delivering air into said supply compartment for passage through said outer portions of the element and out through said discharge compartment.

7. In vehicle heating apparatus, a heat-exchange element having air passages therein, a shell disposed around said element to define a plenum chamber enclosing portions of the element, a baffle in the plenum chamber dividing the same into supply and discharge compartments, a fan operable to recirculate air of the vehicle compartment to be heated and cause the same to pass through portions of said element, and means for delivering air into said supply compartment for passage through said enclosed portions of the element and out through said discharge compartment.

8. In apparatus for air conditioning a vehicle compartment, a heat-exchange core, a shell disposed around the core to define front and back openings at the corresponding faces of the core and also providing a plenum chamber enclosing portions of the core which lie outward of said openings, a baffle in the plenum chamber dividing the same into sections, a fan operable to recirculate air of the vehicle compartment and cause the same to pass through said openings and the corresponding section of the core, and means for taking fresh air from outside the vehicle compartment and delivering the same into one of the plenum chamber sections for passage through the enclosed portions of the core and the other plenum chamber section into the vehicle compartment.

HOWARD J. FINDLEY.